Figure 1:
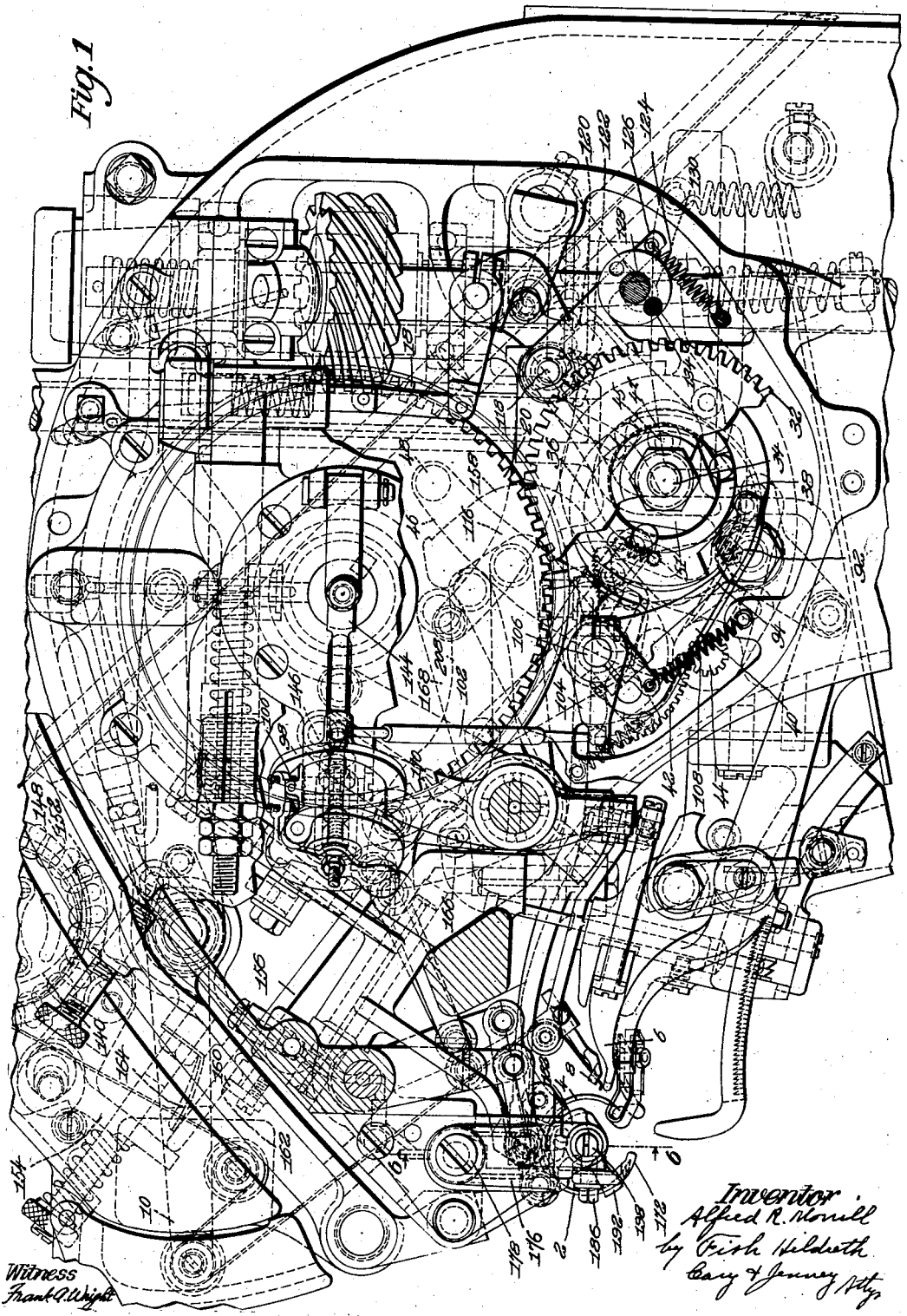

Nov. 5, 1940.   A. R. MORRILL   2,220,112
SHOE SEWING MACHINE
Filed April 1, 1937   12 Sheets-Sheet 2

Witness
Frank A. Wright

Inventor
Alfred R. Morrill
by Fish Hildreth
Cary & Jenney Attys

Nov. 5, 1940.                A. R. MORRILL                 2,220,112
                           SHOE SEWING MACHINE
                         Filed April 1, 1937         12 Sheets-Sheet 3
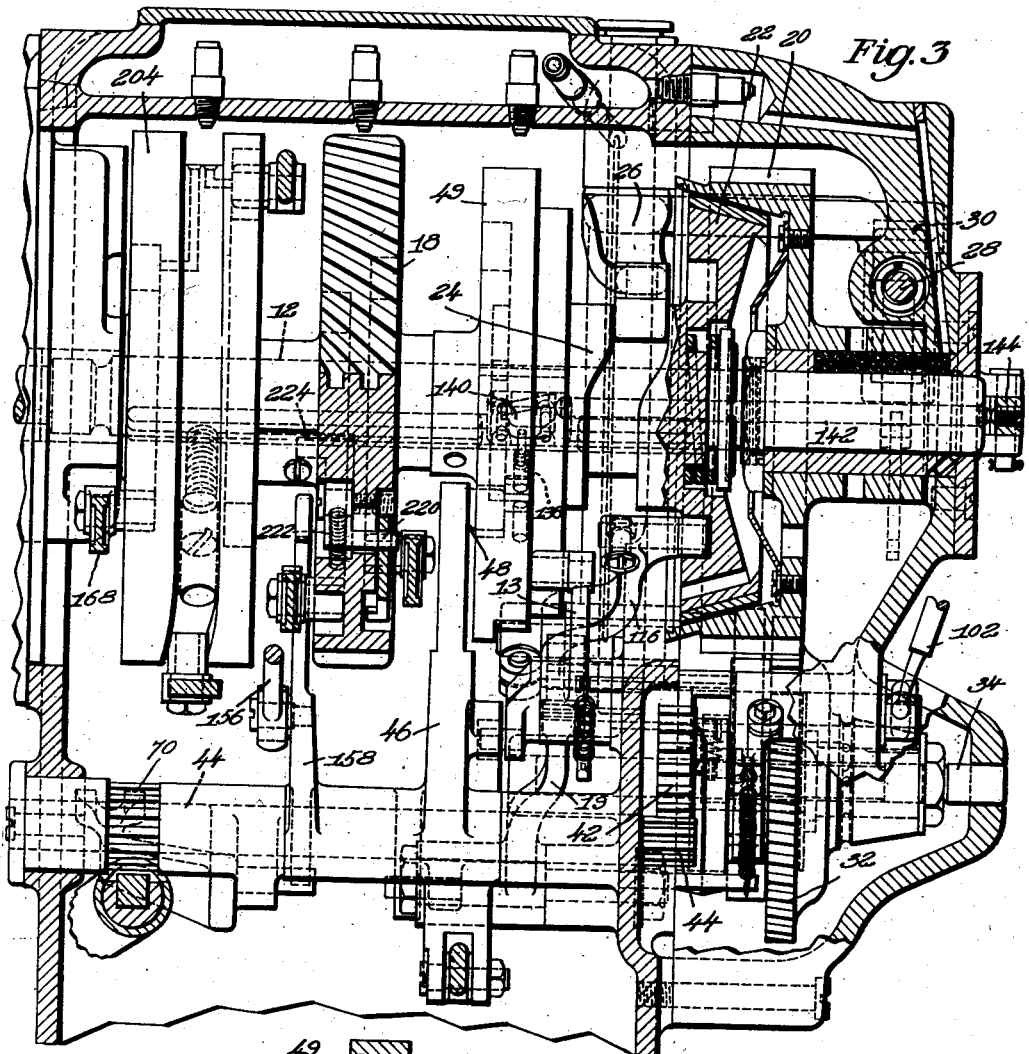
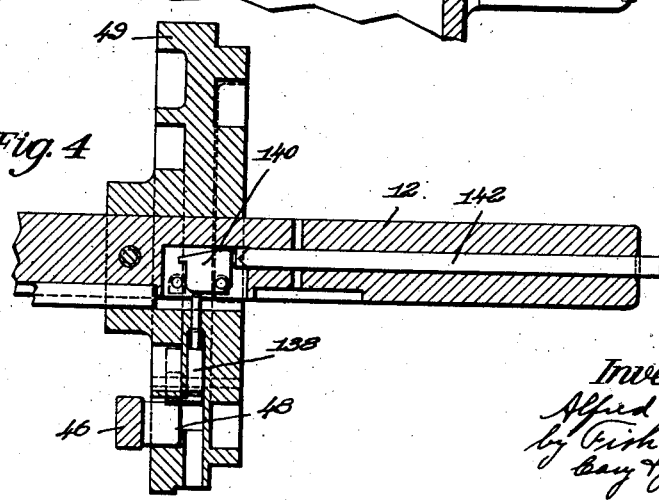

Nov. 5, 1940.  A. R. MORRILL  2,220,112
SHOE SEWING MACHINE
Filed April 1, 1937  12 Sheets-Sheet 4
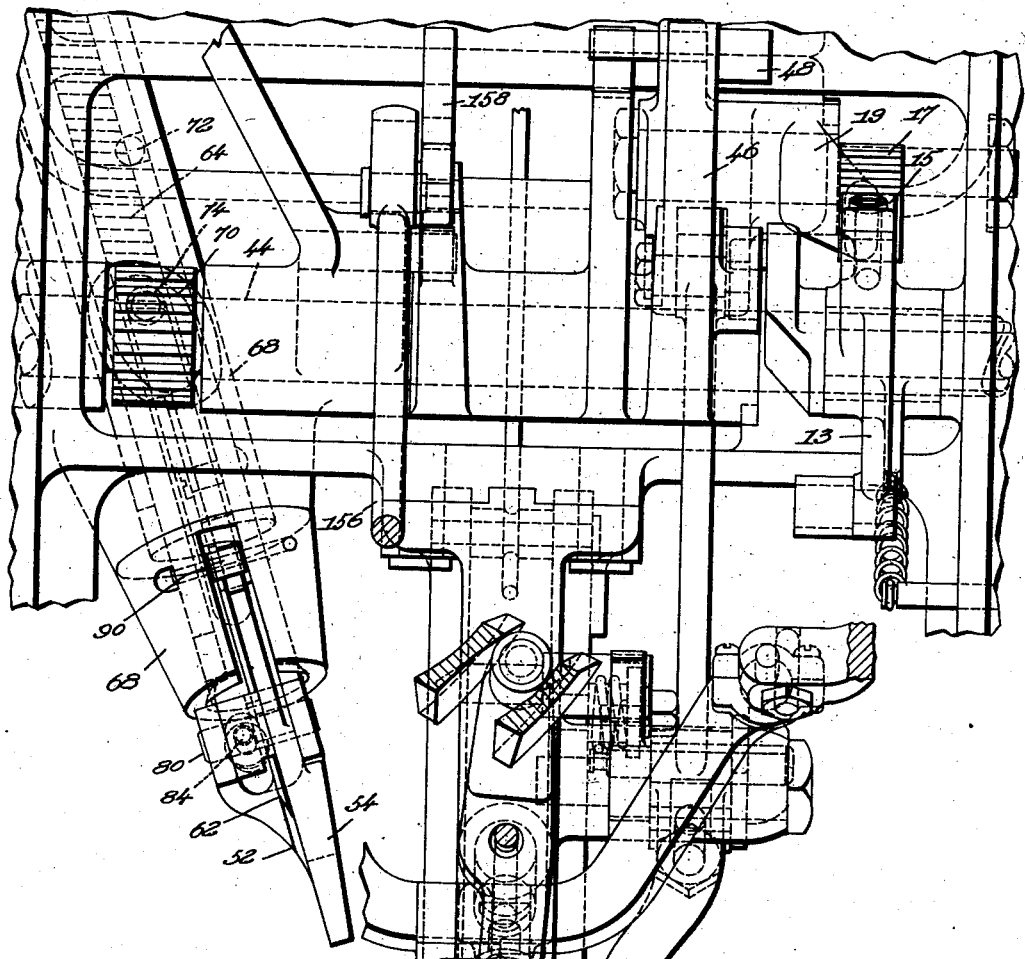
Fig. 5
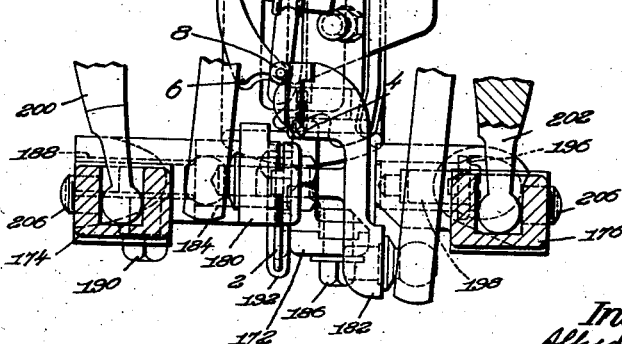

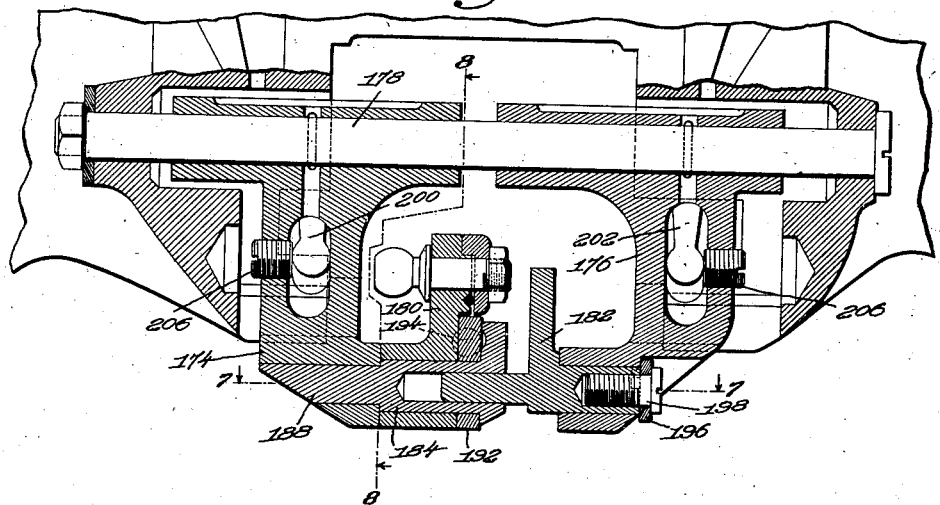
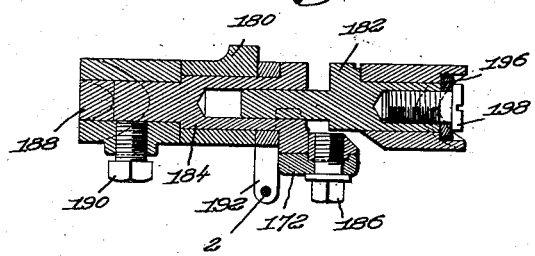
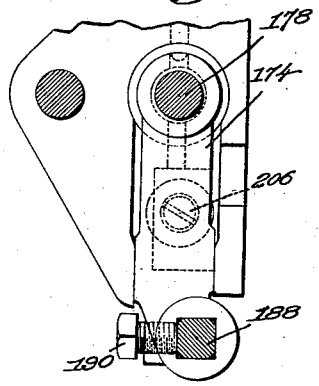

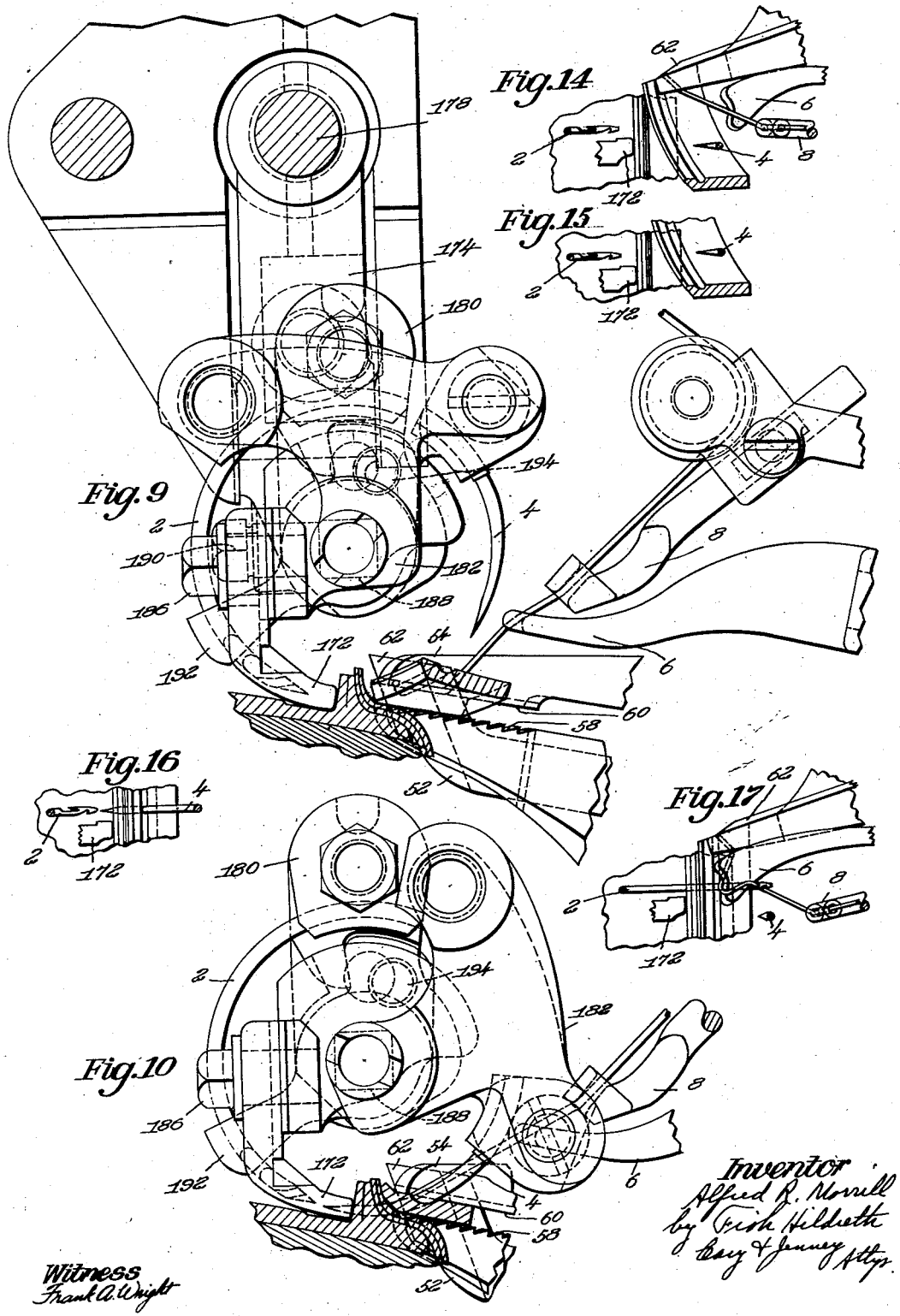

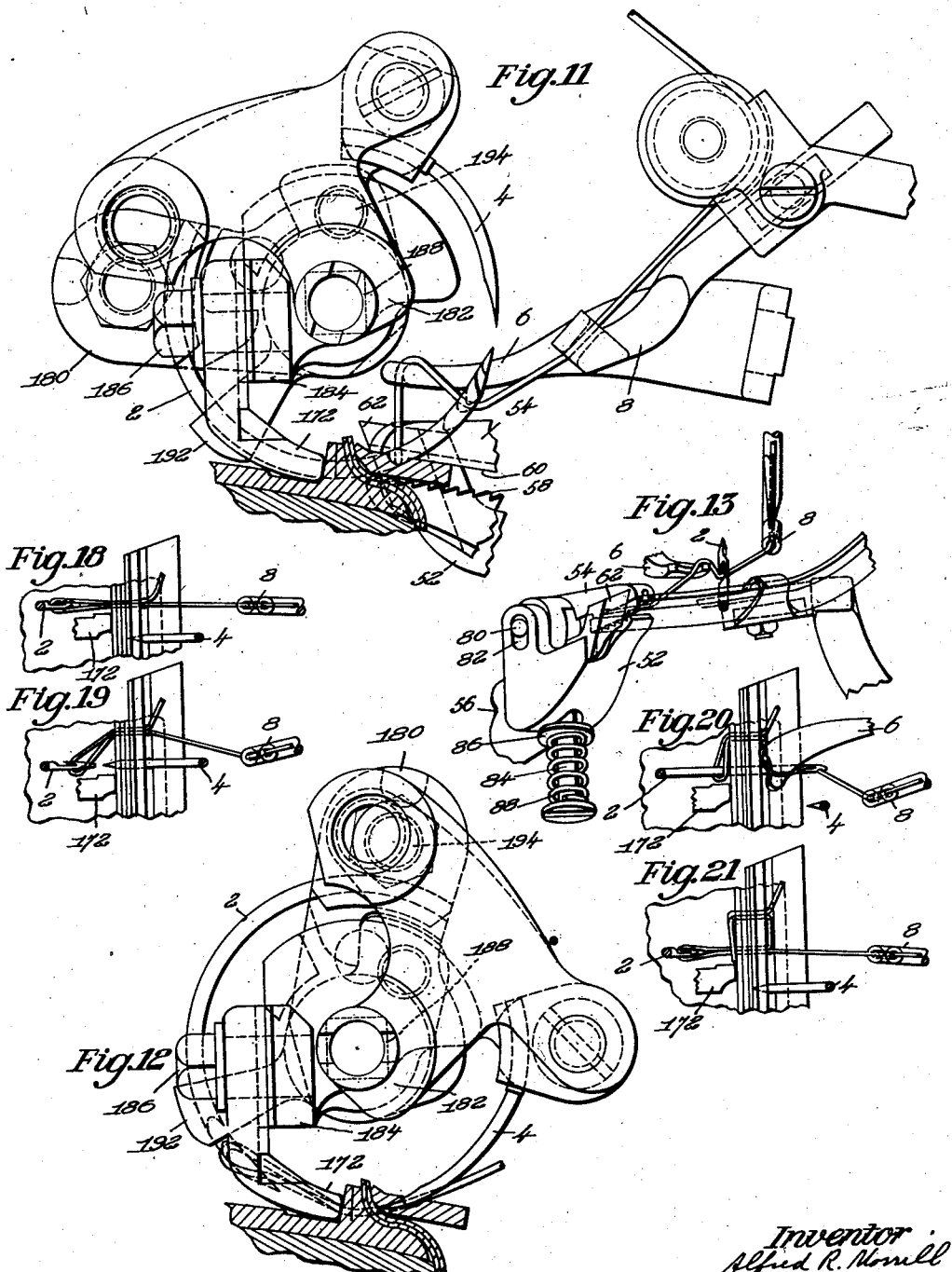

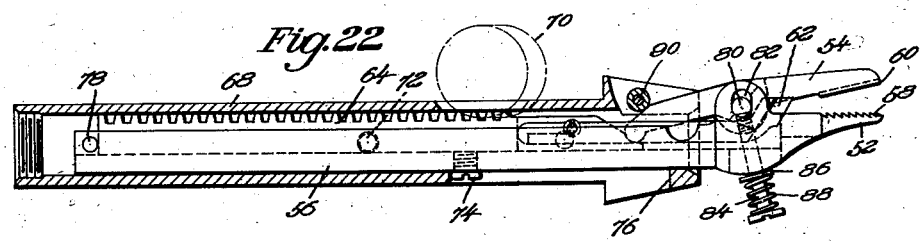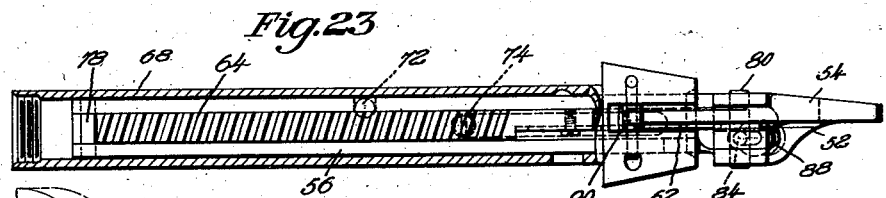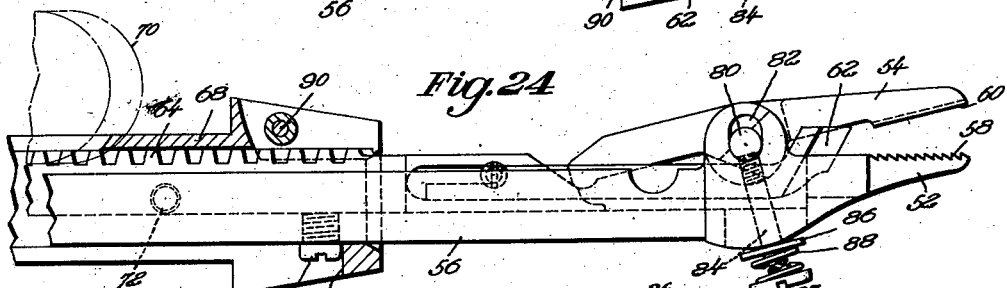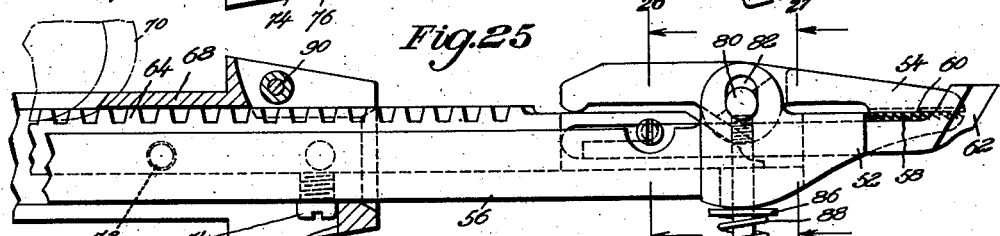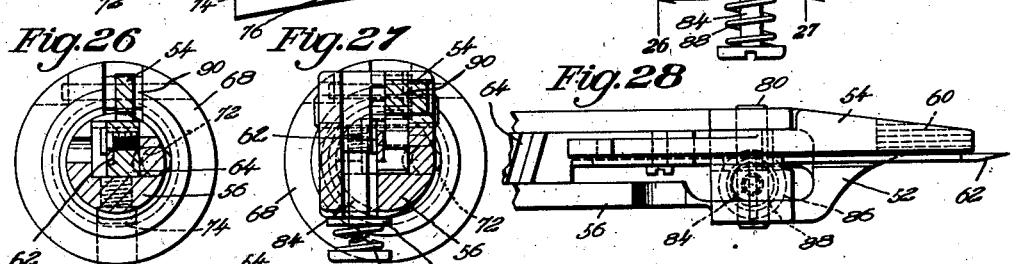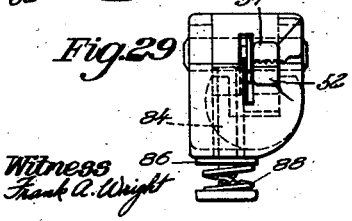

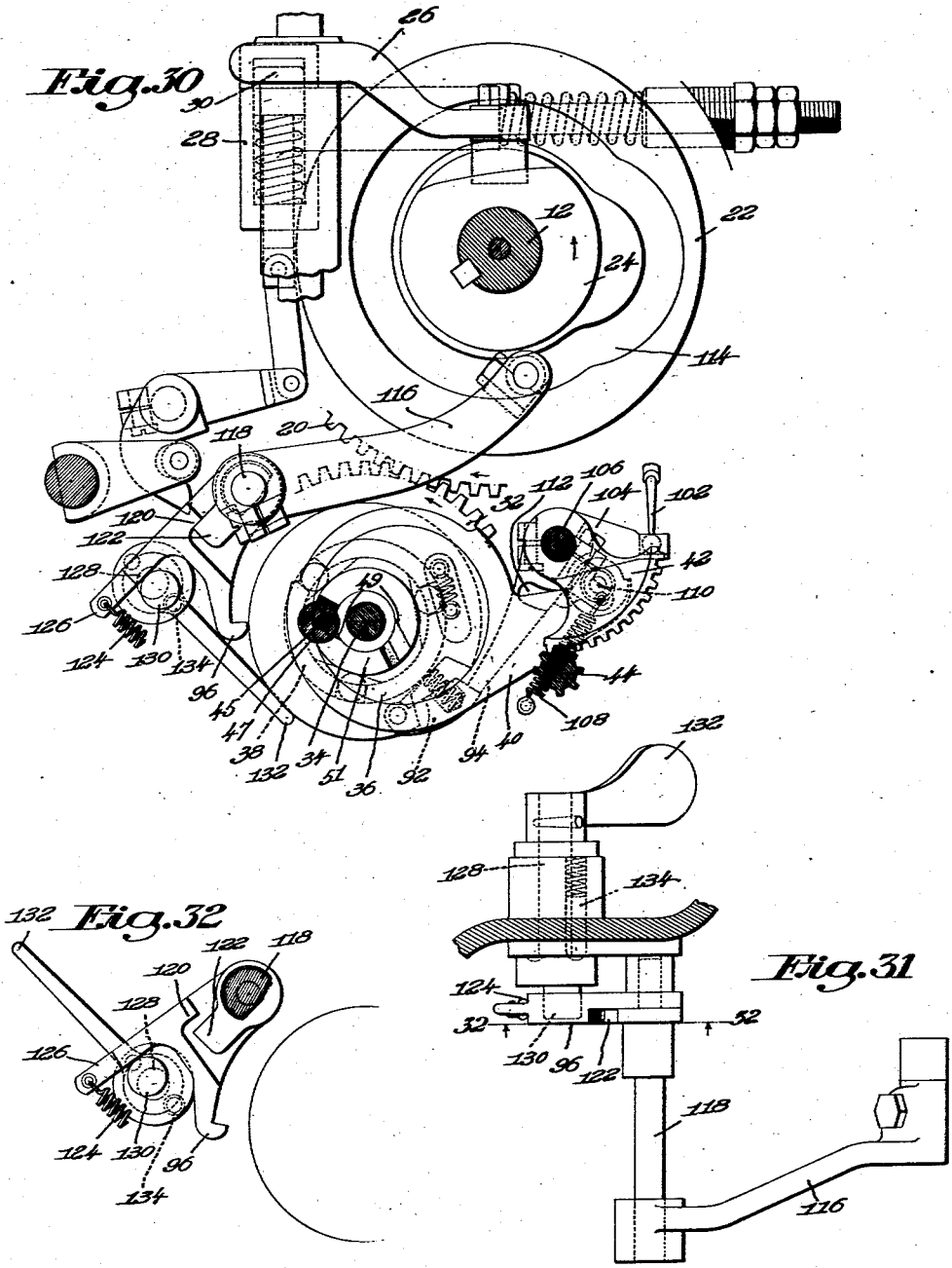

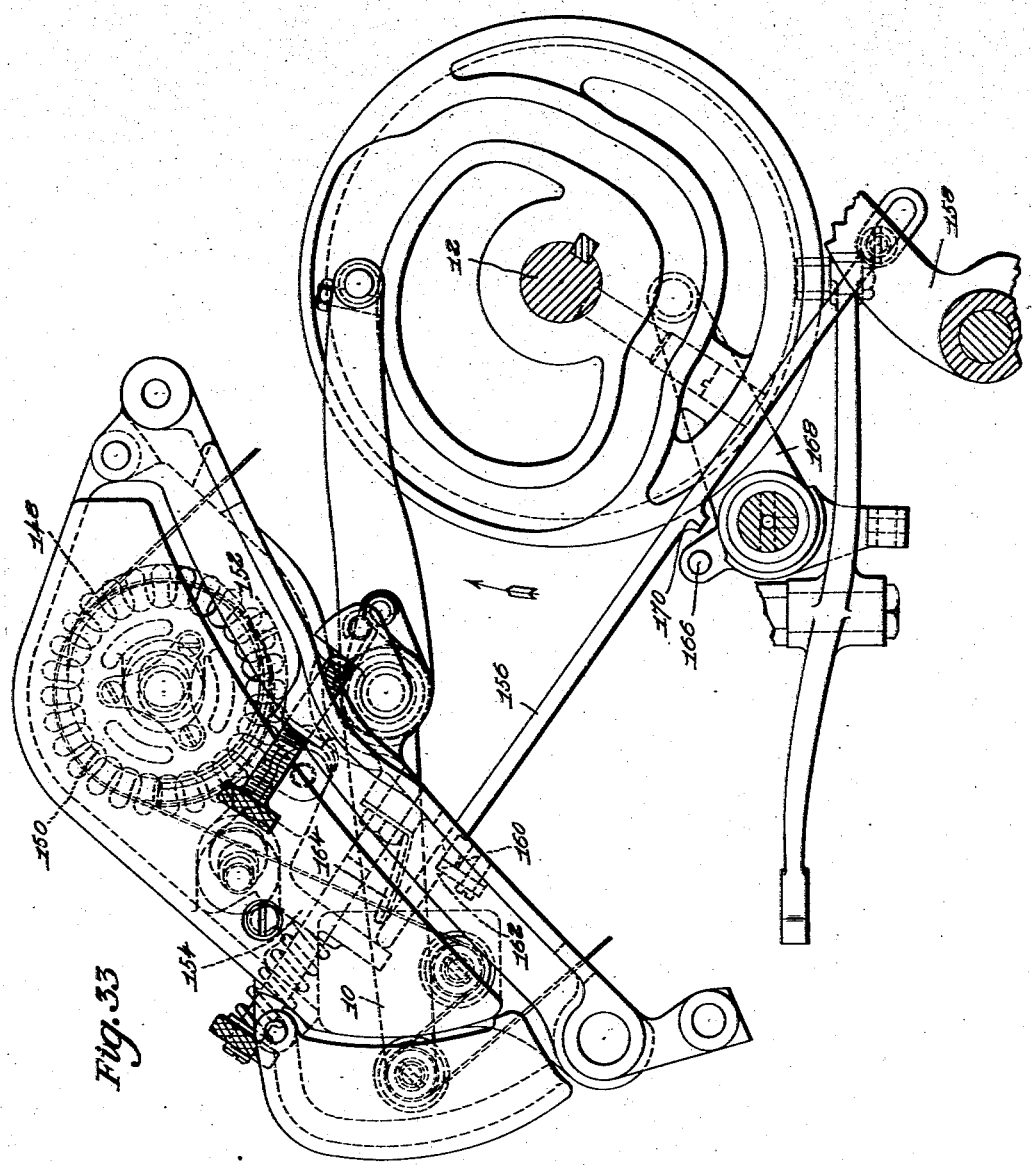

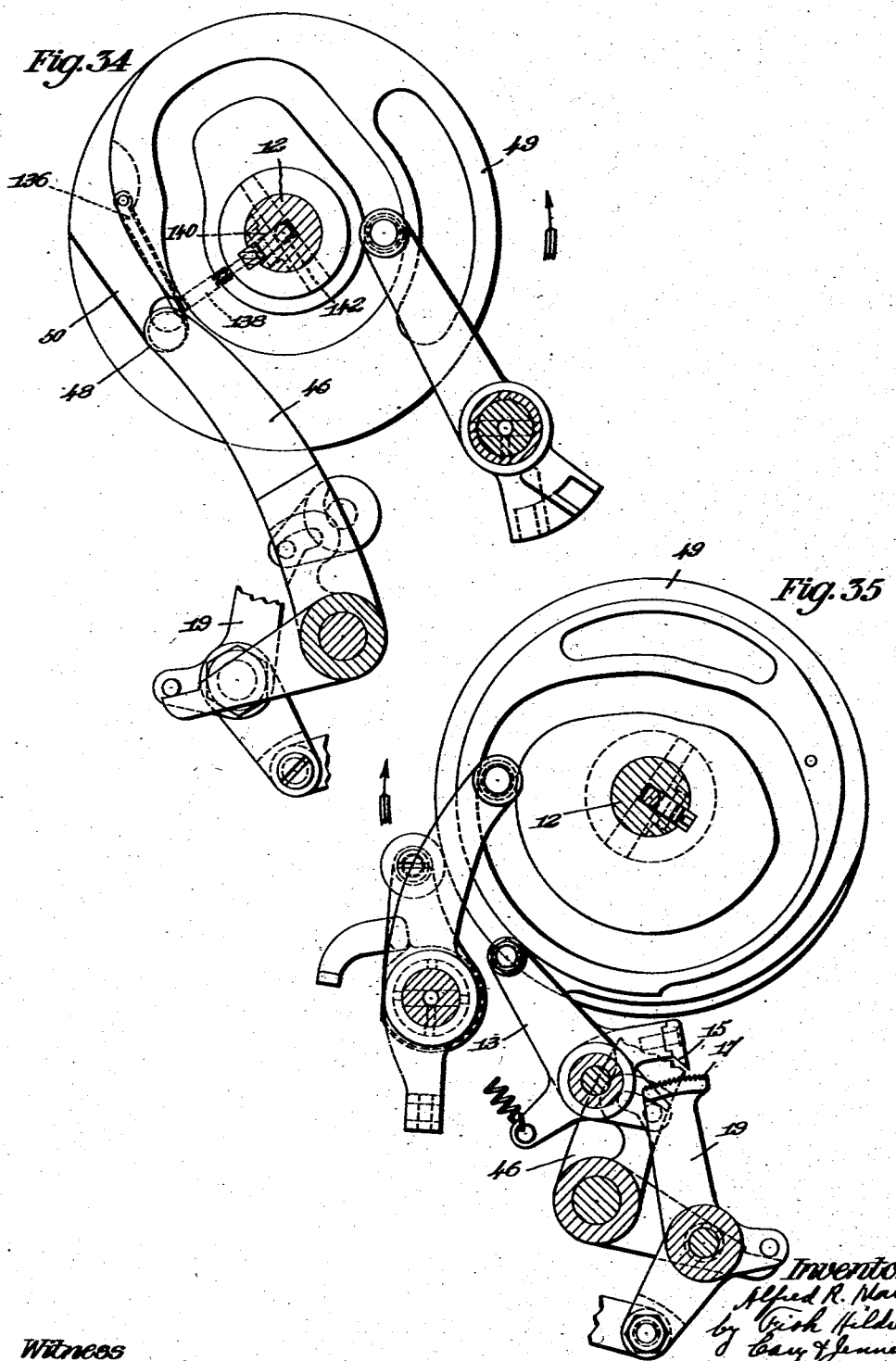

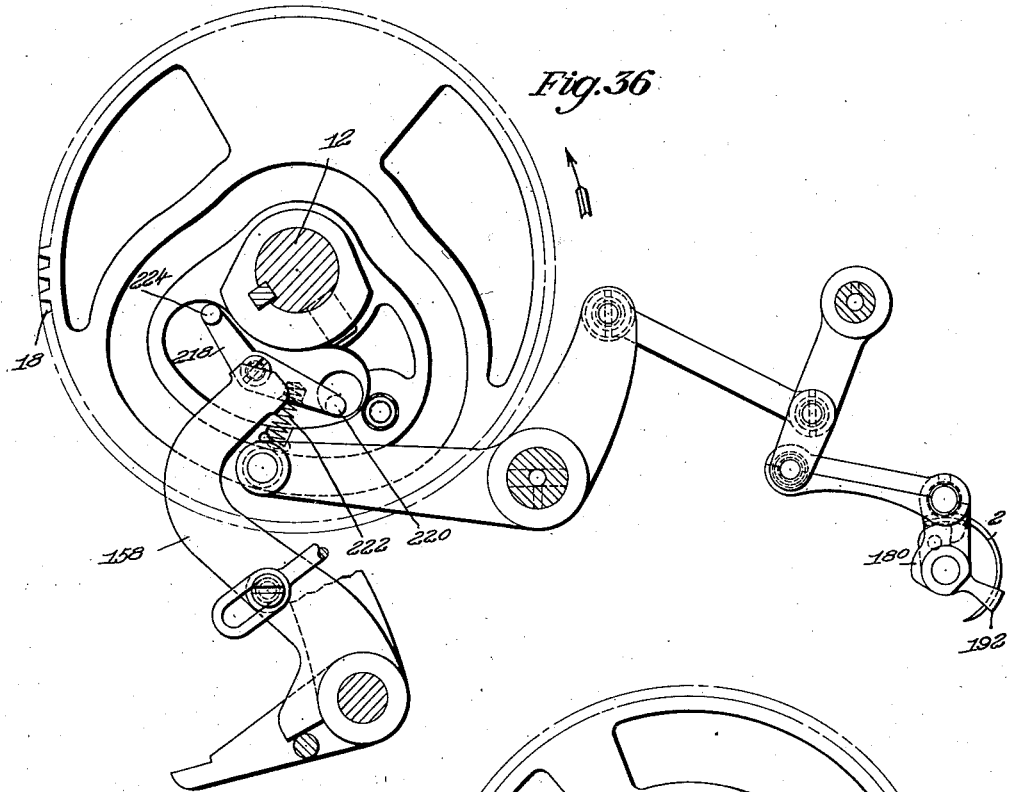
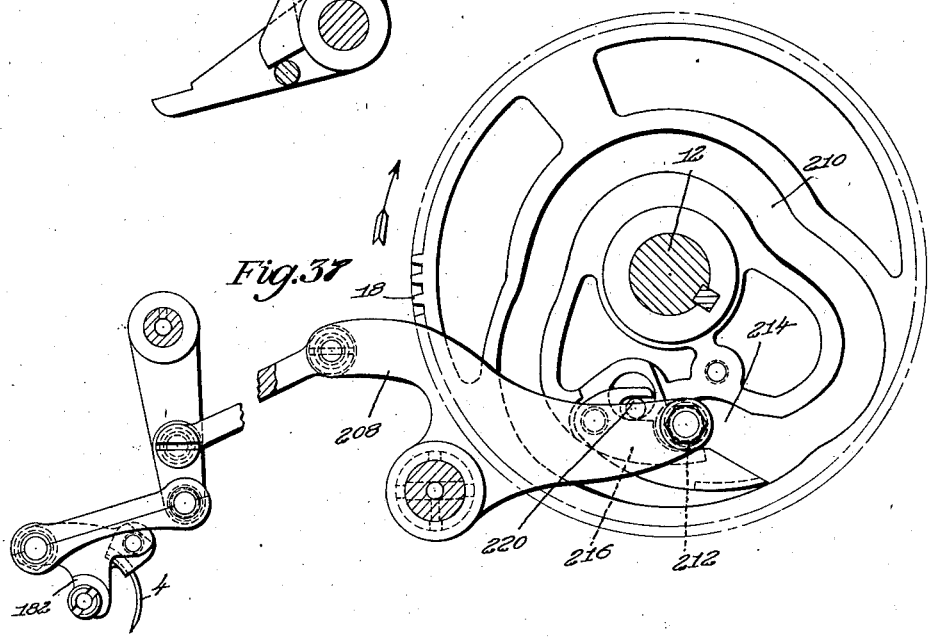

Patented Nov. 5, 1940

2,220,112

UNITED STATES PATENT OFFICE 2,220,112

SHOE SEWING MACHINE

Alfred R. Morrill, Beverly, Mass., assignor to United Shoe Machinery Corporation, Borough of Flemington, N. J., a corporation of New Jersey Application April 1, 1937, Serial No. 134,319

13 Claims. (Cl. 112—46)

The present invention relates to inseam shoe sewing machines, and is herein shown as embodied in a curved hook needle chainstitch machine similar in many respects to the machines disclosed in applicant's prior Patents No. 1,971,575 dated August 28, 1934, and No. 2,041,945 dated May 26, 1936.

An object of the present invention is to provide a welt inseam shoe sewing machine having improved and simplified means for handling and controlling the thread and welt at the beginning and end of the inseam sewing operation.

Other objects of the invention are, in general, to improve the construction and mode of operation of the various parts of the inseam shoe sewing machines, as will hereinafter appear.

With the above objects in view, a feature of the present invention contemplates utilizing the welt cutting and gripping devices of the machine to grip and cut the thread, whereby the machine is provided with an efficient thread cutting and holding mechanism without the addition to the machine of any extra parts. To this end a welt cutting and gripping mechanism has been provided comprising welt gripping jaws which are arranged so as to be movable towards the shoe at the completion of the seam and receive between them both the welt and the thread, together with means for closing the jaws to clamp the welt between them and to clamp the thread against the welt. The welt cutting and gripping mechanism also comprises a welt severing knife and, in the construction hereinafter described, this knife acts to sever both the welt and the thread while clamped between the jaws. By utilizing the welt gripping and severing devices also to cut the thread, not only is a simple and effective thread cutting mechanism provided, but the thread is cut close to the end of the seam so that no trimming of the thread end, as a separate operation, is required during the maufacture of the shoe. In the mechanism hereinafter described, the welt and thread gripping jaws remain in engagement with the welt and thread until the seam on the next shoe has been started, and thus the seam is started close to the end of the welt and thread so that also, at the beginning of the seam, there is no loose thread end projecting from the shoe requiring a subsequent thread trimming operation.

As regards the novel features of the welt and thread gripping and severing devices, above referred to, it is to be noted that the feature of clamping the thread on the welt is believed to be new, and constitutes a feature of the invention not necessarily limited to use in connection with the welt gripping and severing devices, as above described. It also is to be understood that the feature of arranging a single knife to sever both the welt and the thread is not necessarily limited to use in connection with the other devices with which it is associated in the mechanism hereinafter specifically described. It is also to be understood that the several novel features of the welt and thread gripping and severing devices are not limited to any particular construction and arrangement of parts, or to use in any particular combination except as such limitations are clearly expressed in the claims.

A feature of the present invention relates to an improved construction and arrangement of parts for actuating and controlling the welt measuring devices by which the amount of welt drawn through the welt guide at the completion of the sewing operation is determined. This feature of the invention contemplates the provision of novel and improved devices actuated from the sewing cam shaft on stopping the machine, as will be hereinafter described.

Another feature of the invention relating to the welt gripping and cutting devices contemplates the provision of novel and improved means for controlling the operation of the welt gripping and cutting devices at the beginning and end of the sewing operation. In welt sewing machines provided with welt gripping and severing devices, it is the usual practice to so control the operation of the welt gripping jaws that the gripping jaws remain in engagement with the welt until the seam on the next shoe has been started. It is often desirable to cause the gripping jaws to be retracted without throwing the machine into operation, and a feature of the present invention is embodied in an improved means for accomplishing this result. Under certain conditions, as will be hereinafter described, the seam on a new shoe can be started in a satisfactory manner and more conveniently without the use of a welt gripping device and, accordingly, a feature of the present invention is embodied in a construction, hereinafter described and claimed, which permits the welt gripping jaws to have either of two alternative modes of operation; in one case, remaining in engagement with the welt until the operation on the next shoe is started, and in the other case, returning to their retracted position immediately upon severing the welt.

In accordance with another feature relating to the welt gripping and cutting devices, hereinafter described, the welt cutter is given a movement beyond the gripping jaws towards the shoe in order to sever the welt with certainty and is then retracted so as to prevent injury to the shoe during its feeding movement while the gripper remains in gripping engagement with the welt. Another feature relating to the welt gripping and cutting mechanism contemplates the provision of a yielding pivot for one of the gripping jaws in order to permit the jaws to better accommodate themselves to different thicknesses of welt.

Welt and thread gripping and cutting devices embodying the features of the present invention are peculiarly adapted for use in chainstitch machines in which the chain of the inseam is laid in the channel instead of upon the welt and, accordingly, these features of invention have been illustrated as embodied in such a machine, the machine, except as hereinafter described, being the same in all essential parts as the machine disclosed in applicant's prior Patent No. 2,041,945 hereinbefore referred to. These features are not claimed herein but form the subject-matter of divisional applications Serial Nos. 316,385 and 316,386, filed January 30, 1940.

The features of the present invention, above referred to, and other novel constructions, combinations and arrangements of parts hereinafter described and claimed will be apparent to those skilled in the art from the following description, taken in connection with the accompanying drawings which illustrate a welt shoe sewing machine provided with specific embodiments of the several features of the invention.

Figure 2:
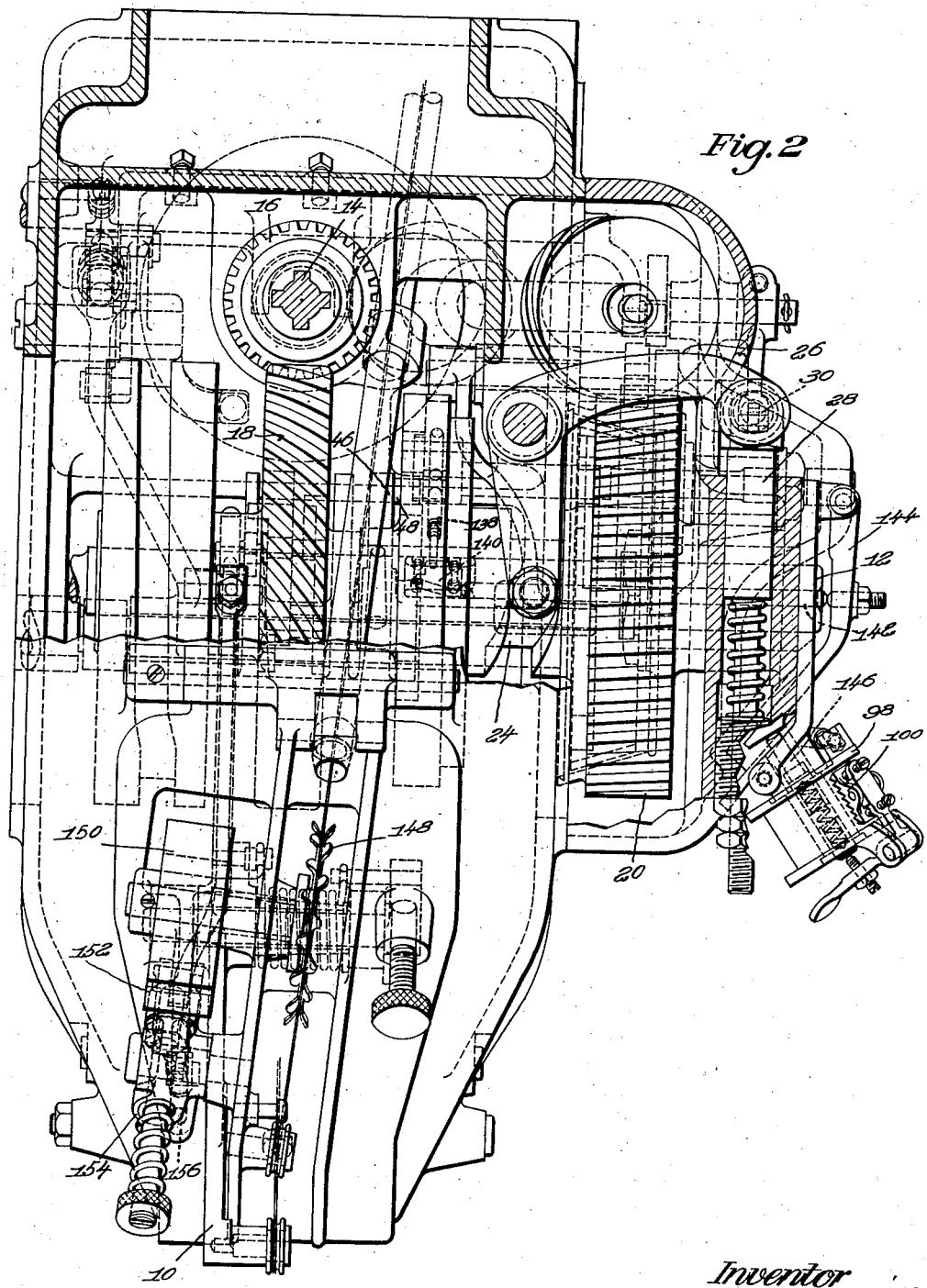

Referring to the drawings, Figure 1 is a view in side elevation of the head of the machine; Figure 2 is a plan view with a portion of the casing broken away to show underlying parts; Figure 3 is a view in sectional elevation of a portion of the machine illustrating particularly the mechanism associated with the cam shaft; Figure 4 is a detail sectional view illustrating a portion of the mechanism for actuating the welt gripper of the welt measuring mechanism; Figure 5 is a detail sectional plan view with portions of the frame broken away; Figure 6 is a detail vertical sectional view, taken on the line 6—6 of Figure 1, illustrating particularly the carriages for the needle and awl; Figure 7 is a detail sectional plan view, taken on the line 7—7 of Figure 6; Figure 8 is a detail cross sectional view, taken on the line 8—8 of Figure 6; Figure 9 is a detail view in side elevation of the stitch-forming, work feeding and welt and thread handling devices adjacent the sewing point, illustrating the position of the parts at the start of the sewing operation; Figures 10, 11 and 12 are views similar to Figure 9, with the machine frame and needle and awl carriages omitted, illustrating the position assumed by the stitch forming, work feeding and welt and thread handling devices at different points in the cycle of operations; Figure 13 is a detail view in front elevation of certain of the parts illustrated in Figure 11; Figures 14 to 21 inclusive are somewhat diagrammatic views, illustrating the positions assumed by the stitch forming, work feeding, and welt and thread handling devices during the first two cycles of stitch forming operations; Figure 22 is a detail view, partly in section, of the welt and thread gripping jaws, the welt and thread severing knife, and their actuating slides; Figure 23 is a plan view of the parts illustrated in Figure 22; Figure 24 is a view similar to Figure 22, on a somewhat enlarged scale, with the parts in the position after the gripping jaws have been advanced towards the shoe; Figure 25 is a view similar to Figure 24, illustrating the gripping jaws in closed position and the knife advanced beyond the end of the jaws; Figures 26 and 27 are cross sectional views, taken respectively on the lines 26—26 and 27—27 of Figure 25; Figure 28 is a detail plan view of the gripping jaws and knife in the position shown in Figure 25; Figure 29 is a view in front elevation of the parts illustrated in Figure 28; Figure 30 is a detail cross sectional view, illustrating particularly the mechanism for controlling the operation of the welt and thread cutting devices; Figure 31 is a detail plan view of certain of the parts illustrated in Figure 30; Figure 32 is a detail sectional view, taken on the line 32 of Figure 31; Figure 33 is a detail view, illustrating, in side elevation, the mechanism for controlling the thread tension during the first stitch forming cycle; Figure 34 is a detail sectional view, illustrating particularly a portion of the connections through which the welt gripping jaw of the welt measuring mechanism is actuated from the stop lever of the machine; Figure 35 is a detail view illustrating a portion of the mechanisms for locking and unlocking the welt guide and work rest; and Figures 36 and 37 are detail sectional views, looking in opposite directions, of the mechanism for separating the needle from the awl upon stopping the machine.

Except as hereinafter pointed out, the various parts of the machine illustrated in the drawings are constructed, arranged and operated as in the machine of applicant's prior Patent No. 2,041,945. The machine is provided with a curved hook needle 2, arranged to enter the work from the channel side, a curved awl 4 entering the work from the welt side, a thread finger 6, a looper 8, and a take-up 10. Work piercing and retracting movements are imparted to the needle and awl, and thread handling movements are imparted to the thread finger, looper, and take-up from the cam shaft 12 through connections which are the same as those embodied in the machine of applicant's prior Patent No. 2,041,945 and, consequently, will not be described herein. The machine is also provided with a work rest and a welt guide constructed, arranged and actuated as in the machine of applicant's prior Patent No. 2,041,945, with the exception that a separate cam lever is provided for actuating the locking pawl of the welt guide mechanism and is arranged to engage an arm projecting from one of the rear supporting links of the welt guide carrier. This welt guide locking mechanism is best shown in Figure 35, the cam actuated pawl carrying lever being indicated at 13, the locking pawl at 15, and the arm projecting upwardly from one of the rear supporting links of the welt guide carrier and provided at its upper end with teeth 17 cooperating with the pawl 15 being indicated at 19.

The driving and stopping mechanism of the machine illustrated in the drawings is also the same as that embodied in the machine of applicant's prior Patent No. 2,041,945 comprising a high speed treadle controlled clutch for driving the cam shaft from the vertical shaft 14 through the spiral gears 16 and 18 and an automatically controlled reversely driven slow speed clutch, the driving member of which is formed in a gear 20 loosely mounted on the cam shaft. The driven member of the slow speed clutch is indicated at 22. The timing cam by which it is moved into and out of engagement with the driven member of the clutch in stopping the machine is indicated at 24. The bell crank which is vibrated by the cam while the machine is in operation and which is locked against movement when the machine is to be stopped, is indicated at 26.
The yieldingly mounted slide which carries the locking pin is indicated at 28 and the locking pin which is controlled through connections to the starting and stopping treadle is indicated at 30. The gear 20 of the slow speed reverse driving and stopping clutch is continuously driven as in the machine of applicant's prior patent, and through a similar train of connections actuates the welt severing mechanism, these connections including a gear 32 meshing with the gear 20 and mounted on a shaft 34, an eccentric 36 fast on the shaft 34 and driven from the gear 32 through a Horton clutch, the roll carrying ring of which is indicated at 38, an eccentric strap 40, an oscillating gear segment 42 driven from the eccentric strap, and a pinion on a shaft 44 meshing with the gear segment. These connections in the construction illustrated in the drawings (see particularly Fig. 30) also include a rebound stop in the form of a spring pressed pin 45 eccentrically mounted in a disk 47 adjustably secured in the machine frame with the pin projecting into the path of substantially diametrically opposite shoulders 49 on a sleeve 51 fast on the shaft 34.

Mechanism for stopping the machine also includes the stop arm and cam follower of the mechanism disclosed in applicant's prior Patent No. 2,041,945, the stop arm (see more particularly Figure 34) being indicated at 46, the follower at the outer end of the arm being indicated at 48, and the cam slot in a cam disk 49 on the cam shaft 12 which is engaged by the follower during the reverse rotation of the cam shaft in stopping the machine being indicated at 50. The stop arm 46, through connections substantially the same as those embodied in the machine of applicant's prior Patent No. 2,041,945, retracts the welt guide as the machine stops and also moves the devices which lock the welt gripping and cutting mechanism out of operation while the machine is running to a position which permits the welt gripping and cutting mechanism to be thrown into operation by a pull on the welt.

Coming now to the illustrated embodiment of the features of the invention relating to devices for handling and controlling the welt and thread at the beginning and end of the inseam sewing operation, the illustrated machine is provided with welt gripping and severing devices which are arranged not only to grip and sever the welt, but also to grip and sever the thread and to retain a grip on the welt and thread until the seam on the next shoe has been started. The welt severing and gripping devices (see more particularly Figures 22 to 29) comprise welt and thread gripping jaws 52 and 54 of which the jaw 52 is rigidly mounted at the forward end of a slide 56 and the jaw 54 is pivotally mounted on the slide. The jaw 52, which when in engagement with the welt extends beneath the welt, is provided with teeth, indicated at 58, extending transversely across the welt engaging face of the jaw, while the cooperating face of the jaw 54 which engages the opposite surface of the welt and also clamps the thread against the welt is provided with teeth, indicated at 60, extending lengthwise of the gripping jaw. This arrangement of the teeth insures a firm grip on the welt while the welt is being severed, and holds the thread securely during the formation of the first stitch until released by the opening of the jaws. The welt and thread gripping and severing devices also comprise a welt and thread severing knife, indicated at 62, which, after the welt and thread have been gripped by the jaws 54 and 52, is arranged to be moved lengthwise of the jaws across the welt and thread clamped by the jaws. In order to insure complete severance of the welt, the knife is moved from its retracted position to a position somewhat beyond the ends of the jaws, as indicated in Figures 25 and 28. The welt gripping jaws, when thrown into operation at the end of the sewing operation are moved towards the shoe and remain in their forward position close to the shoe during at least a portion of the formation of the first stitch. At this time the shoe is being fed through the machine and, in order to avoid possible injury to the shoe by the knife during this feeding movement, the mechanism for actuating the knife is constructed and arranged to retract the knife slightly from its extreme forward position immediately after severing the welt.

The construction for supporting and actuating the gripping jaws and welt severing knife is quite similar to that used in the machine of applicant's prior patent and comprises a sliding rack bar 64 to the forward end of which the welt and thread severing knife 62 is secured, and a slide 52 upon the forward end of which the gripping jaws 52 and 54 are mounted, the slide and rack bar being mounted to reciprocate in a fixed casing 68. The rack bar 64 carrying the severing knife 62 is engaged by a pinion 70 on the shaft 44 and, when moved in one direction acts to advance the jaws into gripping engagement with the welt and thread, and then moves the knife with relation to the jaws to sever the welt and thread; and when moved in the opposite direction, acts to move the knife backwardly with relation to the jaws and then to retract the jaws.
The connections through which the gripping jaws are actuated from the knife carrying slide comprise a locking ball 72 seated in a perforation in one of the walls of the slide 56 which cooperates with locking recesses in the knife carrying slide 64 and casing 68, a stop projection in the form of a screw 74 arranged to engage a shoulder 76 on the casing 68 and a pin 78 arranged to be engaged by the rear end of the knife carrying slide 64. The operation of these connections is fully described in applicant's prior patent.

The gripping jaw 54 is closed upon the welt and thread by the engagement with its rearwardly extending arm of an inclined surface at the forward end of the knife carrying slide 64. The jaw 54 is pivotally mounted upon the slide 56 and, in order to permit the welt engaging surface of the jaw to press evenly on all portions of the welt engaged by the jaw, regardless of the thickness of the welt, and thus insure not only that the welt will be firmly gripped, but that the thread will be firmly pressed against the surface of the welt, the pivot of the jaw is yieldingly supported so that, upon engagement with the welt, the jaw can yield bodily to bring its work engaging surface into substantial parallelism with the surface of the cooperating jaw. In the construction shown, the jaw 54 is provided with oppositely extending journal studs 80 which are received in vertical bearing slots 82 formed in ears projecting upwardly from the forward end of the slide 56. To hold the journal studs yieldingly at the lower end of the slots 82, a rod 84 is provided which extends downwardly from the hub of the gripping jaw 54 and a washer 86 is mounted on the rod and is pressed against a curved surface of the slide 56 by a spring 88 surrounding the rod and interposed between the head of the rod and the washer. In order to move the gripping jaw 54 to open position, a roll 90 is mounted in the forward end of the fixed casing 68 in position to be engaged by an inclined surface on the rear end of the gripping jaw when the jaws are returned to their extreme retracted position.

While the machine is in operation, the welt and thread gripping jaws and severing knife are in retracted position remote from the shoe, as indicated in Figure 5. When thrown into operation after the completion of the seam, the gripping jaws approach the shoe at an angle to the direction of feed and grasp the welt between the end of the seam and the needle. At this time the thread handling devices of the machine are at rest and the thread leading from the last stitch to the looper extends across the welt and across the path of the gripping jaws. As the jaws close upon the welt, the thread is clamped against the welt and immediately the knife is advanced to sever the welt and thread, and is then retracted slightly. The relative position of the gripping jaws, knife, looper, thread finger, needle and awl at this time, is indicated in Figure 14. The parts remain in this position until a new shoe is placed in the machine. Upon starting the machine, the needle and awl are moved with relation to each other in the line of feed, as indicated in Figure 15; the awl is advanced through the work, as indicated in Figure 16; the awl is then retracted and the needle advanced to the position indicated in Figure 17; the thread finger is actuated to form a bight of thread between the needle and the gripping jaws, and the needle is retracted to the position indicated in Figure 18, drawing a loop of thread through the work. During these operations, the gripping jaws retain their grip on the welt and thread until the needle is nearing the end of its retracting movement, at which time the jaws are actuated to release the welt and thread, and are moved rearwardly to their original position away from the shoe. The end of the thread entering into the new seam is held, during the action of the thread finger and looper in forming the first stitch, and is released in time to permit the free end of thread to be drawn close to the surface of the welt. The thread in the first stitch is thus drawn tightly into place and so short a length of thread is left projecting from the seam that no separate thread trimming operation is required in completing the shoe.

In the illustrated machine, the operation of the welt and thread gripping and cutting mechanism is controlled by means of two stop arms which are arranged to engage a latch 92 (see Fig. 30) mounted upon the roll carrying ring 38 of the Horton clutch which is included in the connections for actuating the welt and thread gripping and severing devices. One of these stop arms, indicated at 94, upon engagement with the latch 92, acts to stop the welt and thread cutting and gripping devices with the gripping jaws in retracted position away from the shoe and, upon releasing the latch 92, acts to throw said mechanism into operation to cause the jaws and knife to be advanced towards the shoe. The other stop arm, indicated at 96, upon engaging the latch 92, acts to stop the welt and thread gripping and cutting mechanism with the gripping jaws in gripping engagement with the welt and thread, and upon releasing the latch, acts to throw said mechanism again into operation. The stop arm 94 is actuated by the operator to release the latch 92 at the completion of the sewing operation. The arm 96 is actuated automatically from a cam on the cam shaft of the machine during the first stitch forming cycle in sewing a new shoe.

In the illustrated machine, the stop arm 94 is actuated by the operator by moving the shoe slightly so as to draw welt through the welt guide and exert a pull on the welt. The mechanism through which the stop arm 94 is actuated comprises a welt measuring mechanism for limiting the amount of welt drawn through the welt guide, which mechanism, except for the construction by which the welt gripper of said mechanism is actuated, is the same in all essential particulars as that disclosed in applicant's prior Patent No. 1,971,575. This welt measuring mechanism comprises a drum 98 (see Figs. 1 and 2) over which the welt passes on its way to the welt guide and, a welt gripping jaw 100 mounted on the drum which as the machine comes to rest, is actuated to grip the welt against the drum. While the welt is thus gripped, a pull on the welt serves to rotate the drum, and this rotary movement acts to move the stop arm 94 out of engagement with the latch 92 through a rod 102 connecting the drum with an arm 104 fast on a rock shaft 106 to which the stop arm 94 is secured. A spring 108 connected to an arm secured to the rock shaft 106 serves to rock the shaft and return the stop arm 94 into stopping position. To return the stop arm positively to stopping position in case, for any reason, the spring 108 fails to act, the pin 110 which connects the eccentric strap 40 with the gear segment 42 is arranged to project into a slot 112 in the stop arm 94 and engage the inner end of the slot.

The cam for automatically actuating the stop arm 96 is in the form of a cam slot 114 in the driven member 22 of the slow speed clutch (see Figs. 3 and 30). This cam slot is engaged by a follower on an arm 116 secured to a rock shaft 118. The stop arm 96 is mounted upon the rock shaft 118 so as to be moved into and out of the path of the latch 92 of the Horton clutch when the shaft is rocked.

As has been stated, the stop arm 96, upon engagement with the latch 92, stops the welt and thread cutting and gripping mechanism with the gripping jaws in gripping engagement with the welt and thread. To permit the stop arm to be moved by the operator so as to throw the thread and welt cutting and gripping mechanism into operation, and move the gripping jaws and knife to their retracted position while the machine is at rest, the stop arm is mounted to turn freely on the shaft 118 and is provided with a shoulder 120 which is pressed against an arm 122 fast on the shaft by means of a spring 124 acting upon a downwardly projecting arm 126 of the stop arm. This arrangement permits the stop arm 96 to be moved out of the path of the latch 92 independently of the shaft 118. For so moving the arm, a manually operable shaft 128 is mounted in the machine frame and is provided at its flanged inner end with an eccentrically arranged pin 130 which projects beneath the arm 126 of the stop arm. A handle 132 (see Fig. 31) on the end of the shaft outside of the machine frame is arranged in a position to be conveniently accessible by the operator.

The machines disclosed in applicant's prior Patents Nos. 1,971,575 and 2,041,945 are provided with stitch forming and work feeding devices constructed and arranged to feed the welt with the shoe during the formation of the initial stitches, so that the welt does not become displaced by movements of the shoe not imparted to the welt and, consequently, in these machines there is no necessity for stopping the welt gripping devices in engagement with the welt, but the welt grippers are retracted immediately upon the severing of the welt. To enable the welt gripping jaws of the illustrated machine to be operated either as in the machines of the patents referred to or so as to remain in engagement with the welt, the operable shaft 128 is arranged to be retained either in the position in which the shoulder 120 is held yieldingly in contact with the arm 122 on the rock shaft 118 or alternatively in the position in which the shoulder 120 is held out of engagement with the arm 122. In the first case, the stop arm 96 stops the welt and thread gripping and severing mechanism with the grippers in engagement with the welt and thread, and is actuated by the cam on the cam shaft to throw the mechanism into operation and, in the second case, the stop arm 96 is held permanently out of the path of the latch 92 and has no effect on the operation of the welt and thread gripping and severing mechanism. When the machine is operated with the stop arm 96 permanently in its retracted position, the machine will preferably be provided with the welt gripping jaws illustrated in Patent No. 2,041,945 so as to avoid severing the thread simultaneously with the severing of the welt. In the construction shown (see particularly Figures 31 and 32), the shaft 128 is locked in either position by means of a spring pressed retaining bolt 134 mounted in the machine frame and arranged to engage diametrically opposite recesses in the flanged inner end of the shaft.

The improved construction and arrangement of parts for actuating the welt gripper 100 of the welt measuring mechanism comprises connections actuated, on stopping the machine, from the stop arm 46 and follower 48 (see Figs. 2, 3, 4 and 34). These connections comprise a lever 136 pivotally mounted in the cam disk 49 at one side of the slot 50 with its inner free end in position to be pressed inwardly towards the center of the cam disk by the follower 48 as the follower reaches the inner end of the slot. The lever 136 engages the outer end of a spring pressed plunger 138, the inner end of which bears against one edge of a plate 140 pivotally mounted in the cam shaft 12 and provided with an edge engaging the inner end of a rod 142 mounted in the shaft 12 in alignment with the axis of the shaft, the arrangement being such that an inward movement of the plunger 138 produced by an actuation of the lever 136 by the follower 48 rocks the plate 140 and moves the rod 142 longitudinally. The rod 142 projects beyond the end of the shaft 12 and engages a lever 144 which is pivotally mounted at its rear end on the machine frame and extends horizontally forward into contact with a spring pressed plunger 146 which is mounted in the drum 98, and at its outer end engages an arm of the welt gripper 100.

The thread tension mechanism of the illustrated machine is substantially the same as the thread tension mechanism of applicant's prior patents (see Figs. 1, 2, and 33) and comprises a wheel 148 over which the thread passes, a drum 150 fast on the shaft of the wheel, and a brake shoe 152 engaging the drum pivotally mounted upon a spring pressed bell crank 154. Also, as in the machines of applicant's prior patents, a tension releasing rod 156 is provided, the upper end of which bears against the bell crank 154 and the lower end of which has a pin and slot engagement with an arm 158 fast on the hub of the stop arm 46, the arrangement being such that the rod 156 is actuated during the reverse rotation of the cam shaft in stopping the machine to release the tension on the thread. In the patented machines the rod 156 is actuated to apply the thread tension during the first portion of the forward rotation of the cam shaft in starting a new seam. In the illustrated machine, this mode of operation is undesirable, as in such case the resistance offered by the thread tension during the action of the thread finger, looper and take-up, during the formation of the first stitch, might be sufficient to cause the end of the thread to be pulled from the grip of the welt and thread gripping jaws. Accordingly, in the illustrated machine, means are provided for holding the tension released until the latter part of the first stitch forming cycle, at which time the tension is applied. As illustrated (see particularly Fig. 33) these means comprise a fixed abutment or latch 160 arranged to engage the shoulder 162 of a recess formed in the rod 156, a leaf spring 164 acting to press the upper end of the rod towards the latch 160, and a pin 166 on the hub of a cam actuated lever 168, which during the latter part of the first stitch forming cycle, engages the surface of a projection 170 on the rod and moves the rod to release it from the latch 160.

The means for feeding the work continuously, with which the illustrated machine has been provided, are best illustrated in Fig. 1, and in Figs. 5 to 12 inclusive. The work is fed by the cooperative action of the needle 2, the awl 4, and a channel guide indicated at 172. The channel guide remains continuously in engagement with the bottom of the channel, having no movement except a movement back and forth in the line of feed. The needle and awl move towards and from each other into and out of engagement with the work, and also have a movement relatively to each other back and forth in the line of feed, one or the other of these instruments, during the sewing of a seam, being in engagement with the work. During the movements of the needle and awl back and forth in the line of feed, the channel guide moves with the needle, always maintaining the same fixed position with relation to the needle in the line of feed. The means for supporting the needle and awl in the machine comprise two carriages in the form of somewhat rectangular blocks, the carriage for the needle being indicated at 174, and the carriage for the awl being indicated at 176 (see particularly Figs. 6, 7, 8 and 9. The carriages 174 and 176 are mounted to slide back and forth in the line of feed on a guide rod 178 which passes through perforations in the upper ends of the carriages. Near their lower ends, the carriages are guided in slots formed in the frame of the machine, the slots being provided with vertical guiding surfaces extending parallel with the axis about which the needle and awl turn in piercing the work and engaging corresponding surfaces on the carriages. The needle and awl are clamped respectively on needle and awl segments 180 and 182 and these segments are mounted in the lower ends of the carriages 174 and 176 so as to move about the same axis. The needle segment 180 is mounted in the carriage 174 on a bearing block 184 which extends from the lower end of the carriage towards the awl carriage. The channel guide 172 is secured to the bearing block 184 by means of a clamping bolt 186 in position to engage the channel of a shoe sole close to that side of the needle towards which the shoe is fed. To insure the proper location of the channel guide without any particular care on the part of the operator, the bearing block 184 is provided with a projecting stud 188 which is square in cross-section and which is received in a correspondingly shaped hole in the carriage 174. The bearing block 184 is held rigidly secured to the carriage 174 by means of a clamping bolt 190 threaded into the carriage and engaging the stud 188. A needle guide, indicated at 192, is also mounted on the bearing block 184 between a shoulder formed on the block and the hub of the needle segment. This needle guide is actuated from the needle segment through connections similar to those disclosed in applicant's prior patents comprising a locking ball indicated at 194 mounted in the needle guide and arranged to engage cooperating recesses in the needle segment and in the surface of the shoulder on the bearing block. To mount the awl segment in the awl carriage 176 it is provided on opposite sides with bearing studs, one of which is received in a perforation in the bearing block 184 for the needle and the other of which is mounted to turn in a bearing in the lower end of the carriage 176. The awl segment is held from movement with relation to the carriage 176 in the line of feed by a shoulder on the segment engaging one end of the bearing and a washer 196 engaging the other end of the bearing, which washer is secured to the end of the bearing stud by means of a clamping screw 198.

Reciprocating movements back and forth in the line of feed are imparted to the needle and awl carriages 174 and 176 by means of levers 200 and 202, a separate lever being provided for each carriage and each lever being actuated from a cam groove in the cam disk 204, on the cam shaft 12 of the machine. Each lever at its forward end is rounded off and engages a vertical slot in its corresponding carriage, a close fit being secured by means of an adjusting screw 206 arranged to engage one side of the rounded end of the lever and press the other side against the opposite side of the slot.

The manner in which the needle, awl and channel guide act to impart a continuous feeding movement to the work will be apparent from an inspection of Figures 19, 20 and 21 which shows the relative position of these parts at different points in a stitch forming cycle while the machine is sewing a seam. In Figure 19, the needle has been retracted from the work and the awl has pierced the work, the parts being in the same position as indicated in Figure 16 which illustrates the operation during the first cycle on starting the machine. With the parts in the position illustrated in Figure 19, the awl is feeding the work and the needle and channel guide are being backfed. In Figure 20 the needle has advanced through the work and the awl has been retracted and backfed while the needle is in the work. With the parts in this position the work is being fed by the needle and channel guide, and the awl is about to enter the work. In Figure 21 the awl has entered the work and is feeding the work while the needle has been withdrawn and, together with the channel guide, is being backfed.

To permit the shoe to be readily removed from the machine at the completion of the sewing operation, and also to permit a new shoe to be placed in position, means are provided which, upon stopping the machine with the needle retracted from the work, act to impart additional retracting movement to the awl so as to separate the awl from the needle. This brings the needle and awl into the positions indicated in Figure 14, in which position they remain until the machine has again started. The mechanism for imparting an additional retracting movement to the awl, upon stopping the machine, is best shown in Figures 3, 36 and 37. The awl actuating cam lever is indicated at 208 and the cam groove for actuating the lever is indicated at 210, this cam groove being formed in one face of the spiral gear 18 through which the cam shaft is driven. The lever 208 is provided with a follower 212 which, during the rotation of the cam shaft in a forward direction, as indicated by the arrow in Figure 37, remains in engagement with the cam groove 210. The cam groove 210 is shaped to give the desired work piercing and retracting movements to the awl during the sewing of the seam. Upon stopping the machine, a reverse movement is imparted to the cam shaft 12 by the driving and stopping mechanism and, in the construction shown, this reverse movement is utilized to impart an additional retracting movement to the awl, this retracting movement taking place while the needle is out of engagement with the work. To impart this additional retracting movement to the awl, the gear 18 is provided with an additional cam slot 214 leading from the cam groove 210 inwardly towards the cam shaft. Upon reverse rotation of the cam shaft, the follower 212 enters the cam slot 214 and, as the machine comes to rest, the lever 208 is actuated to retract the awl. The entrance of the follower 212 into the slot 214 during the reverse rotation of the cam shaft is insured by the provision of a switch cam 216 pivotally mounted on the gear 18 and normally held in a position to close the slot 214 and form a portion of one wall of the cam groove 210. During the reverse rotation of the cam shaft the switch cam is moved to the position indicated in Figure 37, in which position it extends across the cam groove 210 and opens the slot 214 for the entrance of the follower 212. For so actuating the switch cam 216, a lever 218 is mounted on the opposite face of the gear 18 from the switch cam and is provided with a pin 220 extending through an opening in the gear into engagement with a slot in the switch cam. During the forward rotation of the cam shaft in sewing a seam, the switch cam is held in a position closing the slot 214 by means of a spring 222 acting on the lever 218. Upon reverse rotation of the cam shaft, the lever 218 is actuated to move the switch cam from its closed position by means of a cam surface on the upper end of the arm 158 which projects from the hub of the stop arm 46. This cam surface is normally out of the path of a pin 224 on the opposite end of the lever 218 from the pin 220, but upon actuation of the stop arm 46 in stopping the machine, the cam surface is moved into the path of the pin 224 and causes an actuation of the lever 218 to move the switch cam 216 to its open position before the cam shaft comes to rest.

The nature and scope of the invention having been indicated, and a machine embodying the several features of the invention having been specifically described, what is claimed is:

1. An inseam shoe sewing machine having, in combination, stitch forming devices, a welt guide, welt gripping jaws movable towards the shoe at the completion of the seam, said stitch forming devices, welt guide and gripping jaws being arranged to cause both the welt and the thread, when the jaws are so moved, before substantial displacement of the shoe to pass between the jaws and the thread to pass across the welt, and means for actuating the jaws to clamp the welt between them and to clamp the thread against the welt and for retaining the jaws in clamping position until the machine is again started into operation.

2. An inseam shoe sewing machine having, in combination, stitch forming devices, a welt guide, welt and thread gripping devices, means operable at the completion of the seam for actuating the gripping devices to grip the welt and thread before substantial displacement of the shoe, and for retaining the devices in gripping position until the machine is again started into operation, a welt severing knife, and means for actuating the knife to sever both the welt and thread.

3. An inseam shoe sewing machine having, in combination, stitch forming devices, a welt guide, welt gripping jaws movable towards the shoe at the completion of the seam, said stitch forming devices, welt guide and gripping jaws being arranged to cause both the welt and the thread, when the jaws are so moved, before substantial displacement of the shoe to pass between the jaws and the thread to pass across the welt, a welt severing knife, and means for actuatng the jaws to clamp the welt between them and to clamp the thread against the welt and for retaining the jaws in clamping position until the machine is again started into operation, and means for actuating the knife to sever the clamped thread and welt.

4. An inseam shoe sewing machine having, in combination, stitch forming devices, a welt guide, and means operable at the completion of the seam and before substantial displacement of the shoe to sever the welt and to clamp the thread against the welt and retain the thread in clamped position until the machine is again started into operation.

5. An inseam shoe sewing machine having, in combination, stitch forming devices, a welt guide, welt cutting and gripping devices comprising welt gripping jaws movable towards and from the shoe to grip and release the welt, mechanism for actuating said devices, adjustable means for controlling the operation of said mechanism acting under one adjustment to cause said mechanism, when thrown into operation, to advance and retract the jaws and, under another adjustment, to cause said mechanism, when thrown into operation, to advance the jaws and retain them in gripping engagement with the welt, and when again thrown into operation, to retract the jaws.

6. An inseam shoe sewing machine having, in combination, stitch forming devices, a welt guide, welt cutting and gripping devices comprising welt gripping jaws movable towards and from the shoe to grip and release the welt, mechanism for actuating said devices, comprising a clutch, a clutch controlling arm arranged to be actuated by the operator on stopping the machine acting to throw said mechanism into operation and to stop said mechanism with the gripping jaws in retracted position away from the shoe, a clutch controlling arm arranged to be actuated by the cam shaft on stopping the machine acting to throw said mechanism into operation and to stop said mechanism with the jaws in gripping engagement with the welt, and means under the control of the operator for actuating said last mentioned control arm to throw said mechanism into operation while the cam shaft is at rest.

7. An inseam shoe sewing machine having, in combination, stitch forming devices, a welt guide, welt cutting and gripping devices comprising welt gripping jaws movable towards and from the shoe to grip and release the welt, mechanism for actuating said devices, comprising a clutch, a clutch controlling arm arranged to be actuated by the operator on stopping the machine acting to throw said mechanism into operation and to stop said mechanism with the gripping jaws in retracted position away from the shoe, a clutch controlling arm arranged to be actuated by the cam shaft on stopping the machine acting to throw said mechanism into operation and to stop said mechanism with the jaws in gripping engagement with the welt, and means for rendering said last mentioned control arm inoperative to control the clutch.

8. An inseam shoe sewing machine having, in combination, stitch forming and work feeding devices, a cam shaft and suitable connections for actuating said devices, a welt guide, welt measuring mechanism for gripping and limiting the movement of the welt upon removal of the work, means operating on stopping the machine to impart a reverse movement to the cam shaft, means for limiting the reverse movement of the cam shaft comprising a cam on the cam shaft provided with a slot, a follower to engage the slot on reverse rotation of the cam shaft, and connections actuated from the cam follower upon reversal of the cam shaft to cause the welt measuring mechanism to grip the welt.

9. An inseam shoe sewing machine having, in combination, stitch forming and work feeding devices, a cam shaft and suitable connections for actuating said devices, welt cutting and gripping devices comprising welt gripping jaws movable towards and from the shoe to grip and release the welt, mechanism for actuating said devices, mechanism for gripping and limiting the movement of the welt upon removal of the work, connections from the welt measuring mechanism for throwing into operation the mechanism for actuating the welt gripping and cutting devices upon removal of the work, means operating on stopping the machine to impart a reverse movement to the cam shaft, means for limiting the reverse movement of the cam shaft comprising a cam on the cam shaft provided with a slot and a follower to engage the slot on reverse rotation of the cam shaft, and connections actuated from the cam follower on reversal of the cam shaft to cause the welt measuring mechanism to grip the welt.

10. An inseam shoe sewing machine having, in combination, stitch forming and work feeding devices, a cam shaft and suitable connections for actuating said devices, a welt guide, welt measuring mechanism for gripping and limiting the movement of the welt upon removal of the work, a rod mounted to move lengthwise of the cam shaft, connections actuated by the rod for causing the welt measuring mechanism to grip the welt, and means for actuating the rod on stopping the machine.

11. An inseam shoe sewing machine having, in combination, stitch forming and work feeding devices, a cam shaft and suitable connections for actuating said devices, a welt guide, welt measuring mechanism for gripping and limiting the movement of the welt upon removal of the work, a rod mounted to move lengthwise of the cam shaft, connections actuated by the rod for causing the welt measuring mechanism to grip the welt, and means actuated from the cam shaft on stopping the machine for moving the rod.

12. An inseam shoe sewing machine having, in combination, stitch forming devices, a welt guide, welt cutting and gripping devices comprising welt gripping jaws movable towards and from the shoe to grip and release the welt, a welt severing knife movable transversely across the welt to sever the welt while gripped by the jaws, means for actuating the jaws to clamp the welt after the completion of the seam and for maintaining the jaws in gripping engagement with the welt until the machine is again started into operation, and means for moving the knife towards the shoe beyond the jaws in severing the welt and for then retracting the knife.

13. An inseam shoe sewing machine having, in combination, stitch forming devices, a welt guide, welt gripping devices comprising welt gripping jaws movable towards and from the shoe, a carrier for the jaws upon which at least one of said jaws is pivotally mounted, a yielding support for the pivot of the pivotally mounted jaw permitting bodily movement of the jaw to accommodate welts of different thickness, and means for actuating the carrier to move the jaws towards and from the shoe and for actuating the jaws to grip and release the welt.

ALFRED R. MORRILL.